(12) United States Patent
Giannelis et al.

(10) Patent No.: US 9,849,451 B2
(45) Date of Patent: Dec. 26, 2017

(54) NANOSCALE IONIC MATERIAL (NIM) COMPOSITIONS VIA ACID/BASE REACTION

(75) Inventors: Emmanuel P. Giannelis, Ithaca, NY (US); Nikhil Fernandes, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 969 days.

(21) Appl. No.: 14/006,395

(22) PCT Filed: Mar. 21, 2012

(86) PCT No.: PCT/US2012/029910
§ 371 (c)(1),
(2), (4) Date: Nov. 21, 2013

(87) PCT Pub. No.: WO2012/129279
PCT Pub. Date: Sep. 27, 2012

(65) Prior Publication Data
US 2014/0070139 A1 Mar. 13, 2014

Related U.S. Application Data

(60) Provisional application No. 61/466,805, filed on Mar. 22, 2011.

(51) Int. Cl.
*B01J 43/00* (2006.01)
*C01B 33/12* (2006.01)
(Continued)

(52) U.S. Cl.
CPC ............... *B01J 43/00* (2013.01); *B82Y 30/00* (2013.01); *C01B 33/12* (2013.01); *C01B 33/158* (2013.01);
(Continued)

(58) Field of Classification Search
CPC ........................................................ C08K 3/22
See application file for complete search history.

(56) References Cited

U.S. PATENT DOCUMENTS 6,225,374 B1   5/2001   Vaia et al.
7,915,353 B2   3/2011   Lee et al.
(Continued)

FOREIGN PATENT DOCUMENTS

WO   2005037397 A1   4/2005

OTHER PUBLICATIONS

Commissioner, International Search Report and Written Opinion, Korean Intellectual Property Office, dated Oct. 29, 2012.
(Continued)

*Primary Examiner* — Peter F Godenschwager
(74) *Attorney, Agent, or Firm* — Bond, Schoeneck & King, PLLC; William Greener; Alek Szecsy (57) ABSTRACT

A nanoscale ionic material composition, such as but not limited to a nanoscale ionic solid material composition, a nanoscale ionic gel material composition or a nanoscale ionic liquid material composition, may be prepared using an acid/base reaction directly between: (1) one of an acid functional and a base functional inorganic metal oxide nanoparticle core absent an organofunctional corona; and (2) a corresponding complementary one of a basic and acidic functional organic polymer material canopy. Desirably, the nanoscale ionic material composition is formed absent an intervening chemical functionalization process step with respect to the inorganic metal oxide nanoparticle core that provides the corona, such as but not limited to a silane coupling agent chemical functionalization process step with respect to the inorganic metal oxide nanoparticle core to provide the corona.

30 Claims, 5 Drawing Sheets

(51) Int. Cl.
*C01B 33/158* (2006.01)
*C01B 33/18* (2006.01)
*B82Y 30/00* (2011.01)

(52) U.S. Cl.
CPC .......... *C01B 33/18* (2013.01); *C01P 2004/62* (2013.01); *C01P 2004/64* (2013.01)

(56) References Cited

U.S. PATENT DOCUMENTS

| | | | |
|---|---|---|---|
| 2005/0266246 A1 | 12/2005 | Reiss et al. | |
| 2007/0254994 A1 | 11/2007 | Giannelis et al. | |
| 2009/0017378 A1 | 1/2009 | Charest et al. | |
| 2009/0208845 A1* | 8/2009 | Howard | A61N 1/08 429/231.2 |

OTHER PUBLICATIONS

Bourlinos et al., Surface-Functionalized Nanoparticles with Liquid-Like Behavior, Advanced Materials, 2005, 17, No. 2, Jan. 31, 234-237.

Bhattacharjee et al., A Plasmonic Fluid with Dynamically Tunable Optical Properties, Journal of Materials Chemistry, 2009, 19, 8728-8731.

Fernandes et al., Fullerol Ionic Fluids, Nanoscale, 2010, 2, 1653-1656.

Giannelis, Emmanuel P., Synthesizing Optimal NIMS for Carbon Capture, Chemical and Biomolecular Engineering & Materials Science and Engineering, Cornell University, Jun. 16, 2008.

Meerwall et al., Canopy Molecular Mobility in Nanoscale Ionic Materials, Session B4: Biophysics and Nanomaterials May 1, 2010.

Jespersen et al., Canopy dynamics in Nanoscale ionic material, ACS NANO, 2010, vol. 4, No. 7, 3735-3742.

Mullens et al., Modified silica-containing matrices towards the MALDI-TOF-MS detection of small molecules, International Journal of Mass Spectrometry 308 (2011) 311-315.

Rodriguez et al., nanoscale ionic material, Advanced material, 2008,20,4353.

Fernandes et al., A silica nanoparticle based ionic material, Bulletin of the American Physical Society, APS March Meeting 2011, vol. 56, No. 1.

Rodriguez, Robert, Nanoscale Ionic Materials: Synthesis and Properties, Theses and Dissertations (CLOSED).

Meerwall et al., Canopy Dynamics in a Nanoscale Ionic Material, American Physical Society, 2011 Fall Meeting of the APS Ohio-Region Section.

Rodriguez et al., The synthesis and properties of nanoscale ionic materials, Appl. Organometal. Chem. 2010, 24, 581-589.

Rodriguez et al., Nanoscale Ionic Materials, Advanced Materials, 2008, vol. 20, Issue: 22, 4353-4358.

Park, Ah-Hyung Alissa, $CO_2$ Capture using Nanoparticle-based Ionic Materials (NIMs), Columbia University presentation, May 4, 2010.

An et al., Preparation and self-assembly of carboxylic acid-functionalized silica, Journal of Colloid and Interface Science 311 (2007) 507-513.

Schoonman, J., Nanostructured materials in solid state ionics, Solid State Ionics 135 (2000) 5-19.

\* cited by examiner

NANOSCALE IONIC MATERIAL (NIM) COMPOSITIONS VIA ACID/BASE REACTION

CROSS-REFERENCE TO RELATED APPLICATION

This application is related to, and derives priority from, U.S. Provisional Patent Application Ser. No. 61/466,805, filed 22 Mar. 2011 and titled "Ionic Fluid and Method of Manufacture," the contents of which are incorporated herein fully by reference.

BACKGROUND

Field of the Invention

Embodiments relate generally to ionic material compositions and in particular to ionic liquid material compositions and ionic gel material compositions. More particularly, embodiments relate to nanoscale ionic material (NIM) compositions and in particular nanoscale ionic liquid (NIL) material compositions and nanoscale ionic gel (NIG) material compositions, related methods and related applications.

Description of the Related Art

Recent research has demonstrated nanoscale ionic material (NIM) compositions as a new platform for hybrid nanoparticle based materials, which in turn generally comprise an inorganic nanoparticle material core component and an organic polymer material canopy component. Due to their hybrid inorganic nanoparticle material core component and organic polymer material canopy component composition, the properties of nanoscale ionic materials may be tailored over an unusually wide range. Included at one end of the range are nanoscale ionic materials with high inorganic content, which display properties similar to solids. These nanoscale ionic material compositions may be designated as nanoscale ionic solid (NIS) material compositions. Included at an opposite end of the range are nanoscale ionic material compositions with high organic content. These nanoscale ionic material compositions spontaneously form nanoscale ionic liquid (NIL) material compositions that are characterized by transport properties remarkably similar to those of simple molecular liquids, but with negligible vapor pressures. Finally, nanoscale ionic gel (NIG) material compositions include nanoscale ionic material compositions of intermediate inorganic material content and organic material content. As well, nanoscale ionic gel (NIG) material compositions are generally characterized by physical and chemical properties intermediate to those of nanoscale ionic solid (NIS) material compositions and nanoscale ionic liquid (NIL) material compositions.

Since nanoscale ionic material compositions, including in particular nanoscale ionic liquid (NIL) material compositions and nanoscale ionic gel (NIG) material compositions, thus often have unique materials properties, desirable are additional nanoscale ionic material compositions, including but not limited to nanoscale ionic liquid (NIL) material compositions and nanoscale ionic gel (NIG) material compositions, methods for preparing the nanoscale ionic material compositions and applications of the nanoscale ionic material compositions.

SUMMARY

Embodiments provide nanoscale ionic material compositions including but not limited to nanoscale ionic solid, gel and liquid material compositions, and methods for preparing the nanoscale ionic material compositions including but not limited to the nanoscale ionic solid, gel and liquid material compositions. Within the embodiments, the nanoscale ionic material compositions and methods for preparing the nanoscale ionic material compositions rely upon a generalized acid/base reaction directly between a core inorganic metal oxide nanoparticle and a canopy organic polymer material that encapsulates the core inorganic metal oxide nanoparticle. By using such a direct acid/base reaction between the core inorganic metal oxide nanoparticle and the canopy organic polymer material, a simplified processing scheme may be effectuated for preparing a homogeneous nanoscale ionic material composition such as but not limited to a nanoscale ionic solid, gel or liquid material composition, with an attendant avoidance of a coupling agent chemical functionalization processing step that is otherwise used to form a corona interposed between the core inorganic metal oxide nanoparticle and the organic polymer material canopy.

Figure 1:
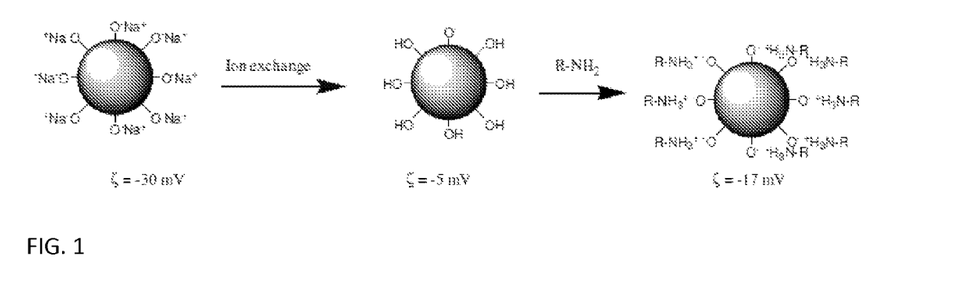
FIG. 1 shows a chemical reaction scheme for preparing a nanoscale ionic material in accordance with the embodiments.

Within the context more specifically of FIG. 1, the invention provides for acid-base-based ionic bonding between the inorganic metal oxide material core and the overlying organic polymer material canopy when forming a nanoscale ionic material composition in accordance with the embodiments.

Figure 8:
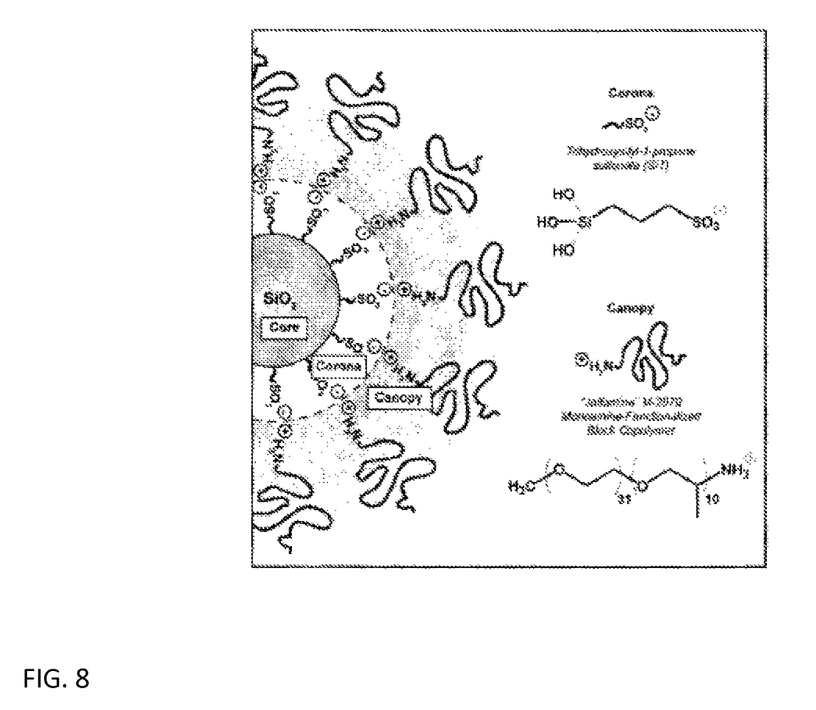
FIG. 8 shows a schematic representation of a nanoscale ionic material illustrating a core component, a corona component and a canopy component to assist in illustrating the embodiments.

As a reference point, a particular nanoscale ionic material that illustrates such a core component, a corona component and a canopy component is shown in FIG. 8. As is illustrated in particular in FIG. 8, the corona component is covalently bonded to the core component and includes a hydroxy silane terminated alkyl organic material chain that is terminated at an opposite end with a sulfonate group that in turn reacts in an acid/base reaction with an amine group within an alkyl amine organic polymer material to form the canopy component. As is understood by a person skilled in the art, the embodiments eliminate within a nanoscale ionic material the foregoing particular corona component by appropriate selection of materials of composition from which are comprised the foregoing core component and the foregoing canopy component. FIG. 8 may be found in Jespersen et al., "Canopy Dynamics in Nanoscale Ionic Materials," ACS Nano, vol. 4(7), 3735-42 (2010), the remainder of which disclosure is otherwise incorporated herein by reference to the full extent as appropriately allowed.

Within the embodiments, and also the claims, the terminology of a "homogeneous" nanoscale ionic material or a "uniformly distributed" core inorganic metal oxide nanoparticle within a nanoscale ionic material is intended as a nanoscale ionic material in accordance with the embodiments where the core inorganic metal oxide nanoparticles are equally volumetrically distributed within a bulk nanoscale ionic material and/or equally areally distributed within a coated nanoscale ionic material. In particular with respect to such a coated nanoscale ionic material, such a uniform distribution of core inorganic metal oxide nanoparticles with respect to each other and a canopy organic polymer material may be determined using a computer assisted image analysis (using, for example and without limitation, ImageJ software available from the National Institutes of Mental Health, Bethesda, Md., USA) of a transmission electron microscopy image of the nanoscale ionic material when coated upon a substrate (see, e.g., the upper transmission electron microscopy image in FIG. 3). Alternatively, small angle x-ray scattering (SAXS) spectroscopy may also be used to determine a dispersion state of core inorganic metal oxide nanoparticles with respect to each other and a canopy organic polymer material. Further alternatively, a qualitative determination of relative locations of core inorganic metal oxide nanoparticles with respect to each other and a canopy organic polymer material may also be used.

Within the context of any one of the foregoing software assisted image analysis method, small angle x-ray scattering spectroscopy analysis method or qualitative determination method, a nanoscale ionic material in accordance with the embodiments is intended as at least substantially non-agglomerated with respect to inorganic metal oxide nanoparticle cores and an intervening organic polymer material canopy, and thus having no greater than about 10 number percent inorganic metal oxide nanoparticle cores agglomerated and touching each other, more preferably no greater than about 5 number percent inorganic metal oxide nanoparticle cores agglomerated and touching each other and still more preferably no greater than about 1 number percent inorganic metal oxide nanoparticle cores agglomerated and touching each other.

Within the embodiments, and also the claims, the terminology "absent a corona" is intended to indicate that no coupling agent functionalization of a core inorganic metal oxide nanoparticle is present when preparing a nanoscale ionic material in accordance with the embodiments. To that end, also thus absent is a related process step in a method for preparing the corona within a nanoscale ionic material in accordance with the embodiments. Within the embodiments, absence of a corona may under certain circumstances be determined using a depth profiling elemental analysis of a nanoscale ionic material composite in accordance with the embodiments to discern that the nanoscale ionic material composite consists of, or consists essentially of, only a core inorganic metal oxide nanoparticle and a canopy organic polymer material (i.e., there will be one organic rich layer surrounding a core inorganic metal oxide nanoparticle rather than two organic rich layers surrounding the core inorganic metal oxide nanoparticle and separated by a comparatively inorganic rich layer). Under such circumstances, analytical tools and methodology such as but not limited to secondary ion mass spectroscopy (SIMS), electron spectroscopy for chemical analysis (ESCA), Auger electron spectroscopy (AES), and other relevant analytical tools and methodology may be used. Alternatively, an investigation of molecular spectroscopy of a nanoscale ionic material in accordance with the embodiments may also be undertaken to inform of the presence or absence of materials compositions that may be identified as a corona that surrounds a core inorganic metal oxide nanoparticle within a nanoscale ionic material. These molecular spectroscopy methods may include, but are not necessarily limited to infrared spectroscopy methods and Raman spectroscopy methods.

Yet another method for discerning the presence or absence of a corona within a nanoscale ionic material in accordance with the embodiments involves preliminary treatment of a nanoscale ionic material in accordance with the embodiments with an alkaline hydroxide material, such as but not limited to a sodium hydroxide material or a potassium hydroxide material, which may be provided in an aqueous solution or a polar non-aqueous solution such as but not limited to an alcohol polar non-aqueous solution. Incident to such alkaline hydroxide material treatment, alkali metal cations are intended and anticipated to exchange with a core inorganic metal oxide nanoparticle of the nanoscale ionic material and release the canopy component that may be soluble within the polar aqueous or polar non-aqueous solvent. The core inorganic metal oxide nanoparticle may then be further analyzed (i.e., using methodology as described above) for the presence, or in particular the absence, of organic chemical functional groups. As noted above, such chemical analysis may be effected using methods including but not limited to spectroscopic analysis methods such as but not limited to infrared spectroscopic analysis methods and Raman spectroscopic analysis methods. Alternatively, a weight loss measurement at a temperature from about 200 to about 300 degrees Celsius for a time period of at least about 2 minutes and typically from about 5 to about 10 minutes using a thermogravimetric analysis method may also be used as an analysis method. Under the foregoing circumstances a "substantial absence" of any residual organic functionality within a released inorganic metal oxide nanoparticle core is intended as less than about 10 weight percent, more preferably less than about 5 weight percent and still more preferably less than about 1 weight percent.

Commonly, a nanoscale ionic material in accordance with the embodiments may be additionally characterized as having an aqueous solution zeta potential of magnitude greater than about +/−5 mV, more preferably of magnitude greater than about +/−10 mV and still more preferably of magnitude greater than about +/−15 mV. Commonly, a nanoscale ionic material in accordance with the embodiments may be additionally characterized as having a conductivity measured neat greater than about $1e^{-7}$ S/cm, more preferably greater than about $1e^{-5}$ S/cm.

A particular nanoparticle in accordance with the embodiments includes an inorganic metal oxide material core absent an organofunctional corona. The particular nanoparticle also includes an organic polymer material canopy surrounding the inorganic metal oxide material core.

A particular composition in accordance with the embodiments includes a plurality of inorganic metal oxide nanoparticle cores each absent an organofunctional corona. The particular composition also includes an organic polymer material canopy uniformly surrounding and uniformly separating each of the plurality of inorganic metal oxide nanoparticle material cores.

A particular method for preparing an ionic material in accordance with the embodiments includes reacting directly at least one inorganic metal oxide nanoparticle core absent an organofunctional corona in an acid/base reaction with a functional organic polymer material to provide a nanoscale ionic material.

BRIEF DESCRIPTION OF THE DRAWINGS

The objects, features and advantages of the embodiments are understood within the context of the Detailed Description of the Embodiments, as set forth below. The Detailed Description of the Embodiments is understood within the context of the accompanying drawings, which form a material part of this disclosure, wherein.

DETAILED DESCRIPTION OF THE EMBODIMENTS

Embodiments provide a nanoscale ionic material composition and a method for preparing the nanoscale ionic material composition. The nanoscale ionic material composition and the method for preparing the nanoscale ionic material composition in accordance with the embodiments are predicated upon an acid/base reaction directly between an acid or base functionalized core inorganic metal oxide nanoparticle and a corresponding complementary base or acid functionalized canopy organic polymer material. The use of such an intrinsic acid or base functionalized core inorganic metal oxide nanoparticle in a direct reaction with a corresponding base or acid functionalized canopy organic polymer material allows for preparing a homogeneous nanoscale ionic material composition, such as but not limited to a homogeneous nanoscale ionic liquid material composition, homogeneous nanoscale ionic gel material composition or homogeneous nanoscale ionic solid material composition, absent need for an intervening chemical functionalization process step to form a corona surrounding the core inorganic metal oxide nanoparticle, such as but not limited to an intervening silane coupling agent (or alternative coupling agent) chemical functionalization process step that forms the corona surrounding the core inorganic metal oxide nanoparticle.

In turn, avoidance of such an intervening chemical functionalization process step, such as but not limited to the intervening silane coupling agent (or alternative coupling agent) chemical functionalization process step allows for materials cost savings, as well as reduced material processing apparatus requirements and related procedures, when preparing a nanoscale ionic material in accordance with the embodiments in comparison with a nanoscale ionic material that is prepared using a method not in accordance with the embodiments.

While the embodiments that follow are illustratively described within the context of a nanoscale ionic material that comprises a nanoscale ionic fluid (i.e., at a particular elevated temperature) that further comprises an acidified silica nanoparticle as a core inorganic metal oxide nanoparticle that is directly reacted within an acid/base reaction with a basic amine functional polyethylene glycol organic polymer material as a canopy organic polymer material, the embodiments are not intended to be so limited.

Rather the embodiments consider within the context of nanoscale ionic material compositions such as but not limited to nanoscale ionic liquid material compositions, nanoscale ionic gel material compositions and nanoscale ionic solid material compositions, the use of inorganic metal oxide materials such as but not limited to at least one of silicon oxide, titanium oxide, zinc oxide, magnesium oxide, calcium oxide, copper oxide, tungsten oxide and zirconium oxide (i.e., both stoichiometric and non-stoichiometric metal oxide particle compositions) inorganic metal oxide materials that may be effectively treated to provide an acid functional inorganic metal oxide nanoparticle or a base functional inorganic metal oxide nanoparticle. Determination of whether a particular metal oxide nanoparticle is a viable candidate as an acid functional metal oxide nanoparticle or a base functional metal oxide nanoparticle may be assisted by considering the isoelectric point of the particular metal oxide nanoparticle. Metal oxide nanoparticles with an isoelectric point below pH 7, or alternatively above pH 7, act within the context of the embodiments as acidic metal oxide nanoparticles or basic metal oxide nanoparticles, respectively. Such acidic or basic inorganic metal oxide nanoparticle materials in turn may be directly reacted with a corresponding complementary base functional organic polymer material or a corresponding complementary acid functional organic polymer material. Most commonly, such acidic or basic inorganic metal oxide nanoparticles may thus include, but are not necessarily limited to silicon oxide, titanium oxide, zinc oxide, magnesium oxide, calcium oxide, copper oxide, tungsten oxide and zirconium oxide inorganic metal oxide nanoparticles in a size range from about 1 to about 500 nanometers and preferably from about 5 to about 100 nanometers and more preferably from about 10 to about 50 nanometers. Similarly, the acidic or basic inorganic metal oxide nanoparticles have a loading within a particular nanoscale ionic material composition from about 1 to about 85 weight percent, more preferably from about 10 to about 75 weight percent and still more preferably from about 15 to about 50 weight percent.

The embodiments also contemplate that a nanoscale ionic material composition in accordance with the embodiments may alternatively comprise: (1) a mixed inorganic metal oxide material nanoparticle (i.e., an inorganic metal oxide material nanoparticle comprising a single inorganic metal oxide material composition that includes multiple inorganic metal oxides); as well as (2) mixtures of different inorganic metal oxide nanoparticles comprised of different and single inorganic metal oxide material compositions. Under either circumstance of: (1) a mixed inorganic metal oxide nanoparticle; or (2) a mixture of different inorganic metal oxide nanoparticles, the same group of inorganic metal oxide materials as listed above may be considered, but individual compositions within the mixed inorganic metal oxide material nanoparticle or within the mixture of inorganic metal oxide nanoparticles are selected to provide only acidic inorganic metal oxide nanoparticles or basic inorganic metal oxide nanoparticles, to thus avoid and minimize nanoparticle to nanoparticle acid/base interactions. Thus, under these circumstances, a mixed inorganic metal oxide material nanoparticle or a mixture of inorganic metal oxide material nanoparticles may comprise at least two of silicon oxide, titanium oxide, zinc oxide, magnesium oxide, calcium oxide, copper oxide, tungsten oxide and zirconium oxide inorganic metal oxide nanoparticle materials selected to provide the mixed inorganic metal oxide material nanoparticle or the mixture of inorganic metal oxide material nanoparticles of only acidic or basic characteristics.

Within the context of base functionality of an organic polymer material canopy in accordance with the embodiments, amine functionality is generally considered but not limiting of the embodiments. Alternative base functionality may include, but is also not limited to imine functionality or pyridine functionality. As well, within the context of acid functionality of an organic polymer material canopy in accordance with the embodiments, carboxylic acid functionality and sulfonic acid functionality are similarly also considered, but also not limiting of the embodiments. Alternative acid functionality may include, but is also not limited to phenol functionality or phosphonic acid functionality. Within the context of either base functionality of an organic polymer material or acid functionality of an organic polymer material in accordance with the embodiments, generally intended (due to expected enhanced performance and processability), but not necessarily specifically required is terminal base functionality or terminal acid functionality.

Thus, the embodiments provide a class of nanoscale ionic material compositions based upon an alternative direct acid/base reaction scheme architecture directly between an inorganic metal oxide nanoparticle core and an organic polymer material canopy that covers the inorganic metal oxide nanoparticle core. The alternative direct acid/base reaction scheme architecture in accordance with the embodiments exploits the innate acid/base character of different types of nanoparticles, and allows for a direct reaction between an inorganic metal oxide nanoparticle core and an organic polymer material canopy when forming a nanoscale ionic material composition in accordance with the embodiments. Compared with alternative processing sequences that may include a chemical functionalization process sequence to provide an organofunctional charged corona for an inorganic metal oxide nanoparticle core, such as but not limited to a silane coupling agent chemical functionalization process sequence to provide the organofunctional chemical charged corona for the inorganic metal oxide nanoparticle core, the present approach eliminates this intermediate, often complex, chemical functionalization process sequence to create the charged corona, which greatly simplifies a synthesis protocol and reduces a number of system components. For example, the reaction conditions for a silane coupling agent silylation chemical functionalization process step to provide a charged corona need to be controlled precisely so that only a monolayer of the corona is formed. Additionally, the product of the reaction of the chemically functional silane coupling agent with the inorganic metal oxide nanoparticle core needs to be exhaustively purified by dialysis or ultrafiltration to ensure removal of frequent byproducts. Since all steps required to synthesize the nanoscale ionic materials in accordance with the embodiments are simple and scalable a manufacturing process sequence in accordance with the embodiments may be readily integrated into current manufacturing environments.

Material System Considerations

The following illustrative embodiment describes the use of silica nanoparticles with an average diameter of 18 nm as a model system for preparing a nanoscale ionic material composition in accordance with the embodiments. Acidic silica nanoparticles were prepared by passing a commercially available $Na^+$ stabilized silica suspension through an $H^+$ ion-exchange column. The resulting acidic solution was then neutralized with an amine terminated polyethylene glycol, $PEG-NH_2$. A range of compositions was readily prepared by controlling the extent of neutralization (i.e. the ratio between the acidic silica nanoparticles and the amine terminated polyethylene glycol polymer $PEG-NH_2$). Finally the water was evaporated to produce the final product.

The presence of the ionic interactions endows the composite nanoscale ionic material composition that results from the acidic silica particles and the amine terminated polyethylene glycol polymer material with a unique behavior not found in dispersions of charged silica in ionic liquids or PEG. First, the new materials do not suffer from the persistent challenges of miscibility and poor dispersion encountered in physical mixtures of inorganic nanoparticle and organic polymer material nanohybrid compositions. In addition, the materials are liquids at 70° C. and exhibit an ionic conductivity of $10e^{-5}$ S/cm. More importantly, when compared with two control samples composed of a physical mixture of $SiO_2$ and PEG (i.e. systems that are void of any electrostatic interactions and thus akin to a dispersion of $SiO_2$ nanoparticles into the polymer) the ionic $SiO_2$ fluids in accordance with the embodiment's exhibit remarkably different dispersion and flow properties. Of the embodied nanoscale ionic material and the two control samples, only the silica nanoscale ionic materials in accordance with the embodiments flow and behave like viscoelastic liquids while both of the control samples are solids exhibiting significant aggregation and phase separation of the particles.

Experimental $PEG-NH_2$ with a molecular weight (MW) of 20,000 g/mol and polydispersity index (PI) 1.02 was purchased from Laysan Biotech. Ludox sodium-stabilized silica (HS30-$Na^+$), α-ω OH-PEG (MW 20,000 g/mol, PI 1.08) and Dowex W2 ion exchange resin were obtained from Sigma Aldrich. All materials were used as supplied.

The chemical reaction scheme as illustrated in FIG. 1 illustrates the approach that was used to synthesize and prepare the silica based nanoscale ionic materials in the form of nanoscale ionic fluids in accordance with embodiments. The HS30-$Na^+$ silica suspension was first diluted to 3 wt % and passed three times through a column of $H^+$ exchanged Dowex resin to fully protonate the surface hydroxyls. The resulting silica suspension (referred to as (HS30)-OH) was then added dropwise to the amine functional PEG solution prepared by dissolving 1 g of the $PEG-NH_2$ in 25 ml of deionized water until the desired silica to PEG ratio was reached. Samples with 5-30 wt % of silica were prepared. The suspension was then stirred vigorously for about an hour and sonicated for five minutes before freeze-drying to remove the water. The resulting fluffy, white powder was heated to about 80° C. under vacuum for 24-48 hours to remove any remaining water as confirmed by TGA.

Two control samples void of the ionic interactions present in nanoscale ionic materials in accordance with the embodiments were prepared for comparison. The first control sample (Control-I) was prepared by simply adding the silica solution (HS30)-$Na^+$ without the ion exchange step directly to the $PEG-NH_2$ solution in the appropriate ratio. The second control sample (Control-II) was prepared by adding ion-exchanged silica (HS30)-OH to α-ω OH-terminated polyethylene glycol in the appropriate ratios.

Chemical and Physical Characterization

Dynamic light scattering (DLS) and zeta potential measurements were obtained in water at 25° C. using a Malvern Nano-ZS zetasizer.

Thermogravimetric analysis (TGA) measurements were obtained using a TA Instruments TGA Q5000 apparatus. Samples were heated at 10° C./min in platinum pans with a dry nitrogen purge gas.

Differential scanning calorimetry (DSC) measurements were obtained using a TA Instruments DSC Q2000 apparatus. Samples of approximately 4-8 mg were sealed in hermetic pans, and heated to 160° C. at 10° C./min to eliminate any previous thermal history before being cooled to 100° C. and heated again to 160° C. at the same rate.

Rheological measurements were obtained using an Anton-Paar Physica MCR-501 rheometer apparatus. The rheometer in turn used a 25 mm diameter parallel plate geometry, and a separation of 0.5 mm in a temperature controlled dry nitrogen atmosphere. All measurements were made at 75° C. For oscillatory measurements, an amplitude sweep was undertaken first, and then oscillation measurements were undertaken using an amplitude that kept the response in the linear viscoelastic range.

Transmission electron microscopy (TEM) measurements were obtained using an FEI T-12 apparatus. A filament voltage of 120 kV was also used. Samples were either deposited on a TEM grid directly from a water suspension, or microtomed into thin films onto carbon-coated grids obtained from Electron Microscope Supplies, Inc.

Results and Discussion

The pH and zeta potential of the as obtained, $Na^+$ stabilized silica suspension are 11 and −30 mV, respectively. Passing the silica through a proton exchanged resin resulted in a suspension with a pH of 3 and a zeta potential of −5 mV. The pH and zeta potential values indicate that nearly all surface groups are in the neutral protonated form as illustrated in FIG. 1.

The acidity of silica surface hydroxyls (silanols) is well established, although the exact pKa values will generally depend on the details of the system under investigation. Typically, two pKa values have been reported for silanols. One of the pKa values is in the 4-5 range, and the other is in the 8-10 range. The more acidic groups are reported to make up anywhere between 10% to 20% of the total surface silanols.

Figure 2:
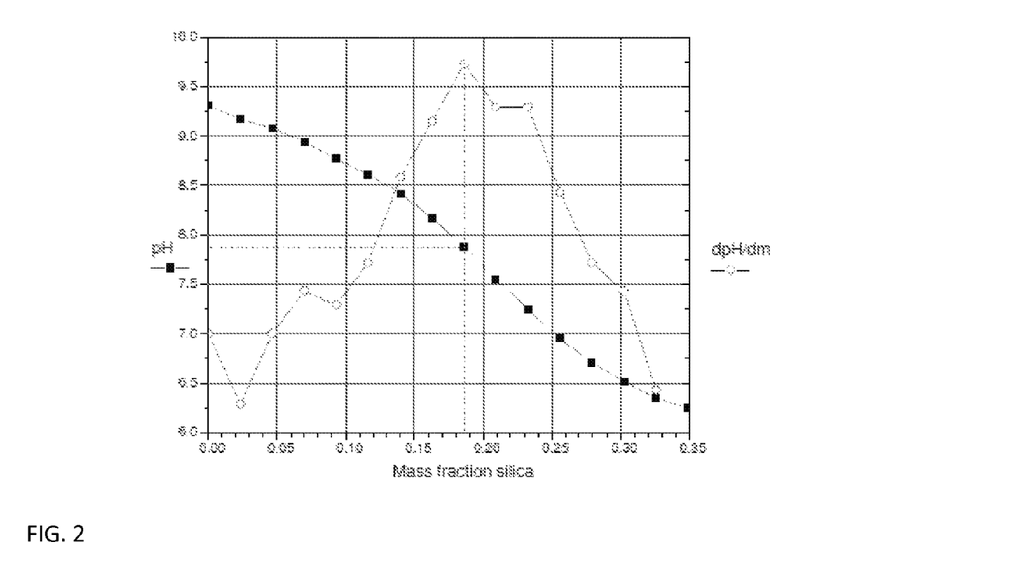
FIG. 2 shows a graph of pH and dpH/dm versus mole fraction of (HS03)-OH silica metal oxide nanoparticle when preparing a nanoscale ionic material in accordance with the embodiments.

The amount of amine functional polyethylene glycol canopy organic polymer material required for full neutralization of the available silanol groups within the acidified silica inorganic metal oxide core was determined by locating an equivalence point in the titration curve for the two materials. FIG. 2 shows the particular titration curve that was obtained when the proton-exchanged silica inorganic metal oxide nanoparticle material cores were added to the solution of the PEG-NH$_2$. While not being bound by a particular theory of operation, the existence of a sigmoidal neutralization curve, as well as a maximum in the derivative, confirm that an acid-base neutralization reaction may take place according to the reaction $(SiO_2)$—$OH+H_2N$—$R$→$(SiO_2)$—$O^-H_3N^+$—$R$ Aliquots of the solution were taken at regular intervals and the particle size was measured while using the above described dynamic light scattering apparatus and methodology. When the amine functional polyethylene glycol material was added dropwise to the silica, the suspension turned turbid instantly suggesting that particle aggregation took place. In contrast, the suspension remained clear if the silica was added drop-wise to a solution of the amine. To avoid particle aggregation all subsequent titrations were undertaken by adding the silica suspension to the amine solution.

After the neutralization reaction, the zeta potential of the resulting suspension was about ζ=−17 mV, indicating that the protons from the hydroxyls had reacted with the terminal amine groups on the PEG-NH$_2$, and the particles were again more negatively charged. Electrical conductivity measurements show an ionic conductivity of $2 \times 10e^{-5}$ S/cm confirming the ionic character of the samples prepared in accordance with the embodiments. The equivalence point obtained from the titration curve corresponds to a sample containing ~20 wt % silica (abbreviated as H-20). Using the mass fraction of silica, and assuming an average radius and density of 9 nm and 2.2 g/cm$^3$, respectively for the silica nanoparticles, one may calculate approximately 1100 PEG chains per silica particle, which corresponds with about 0.8 OH groups per square nanometer surface area of silica reacted. This value is approximately 15% of the ~5 OH groups per square nanometer commonly reported suggesting that it is the more acidic of the two forms of hydroxyls mentioned above that are reacting with the amine. Samples with silica compositions above the equivalence point are not completely neutralized while those below the equivalent point contain excess PEG molecules.

Figure 3:
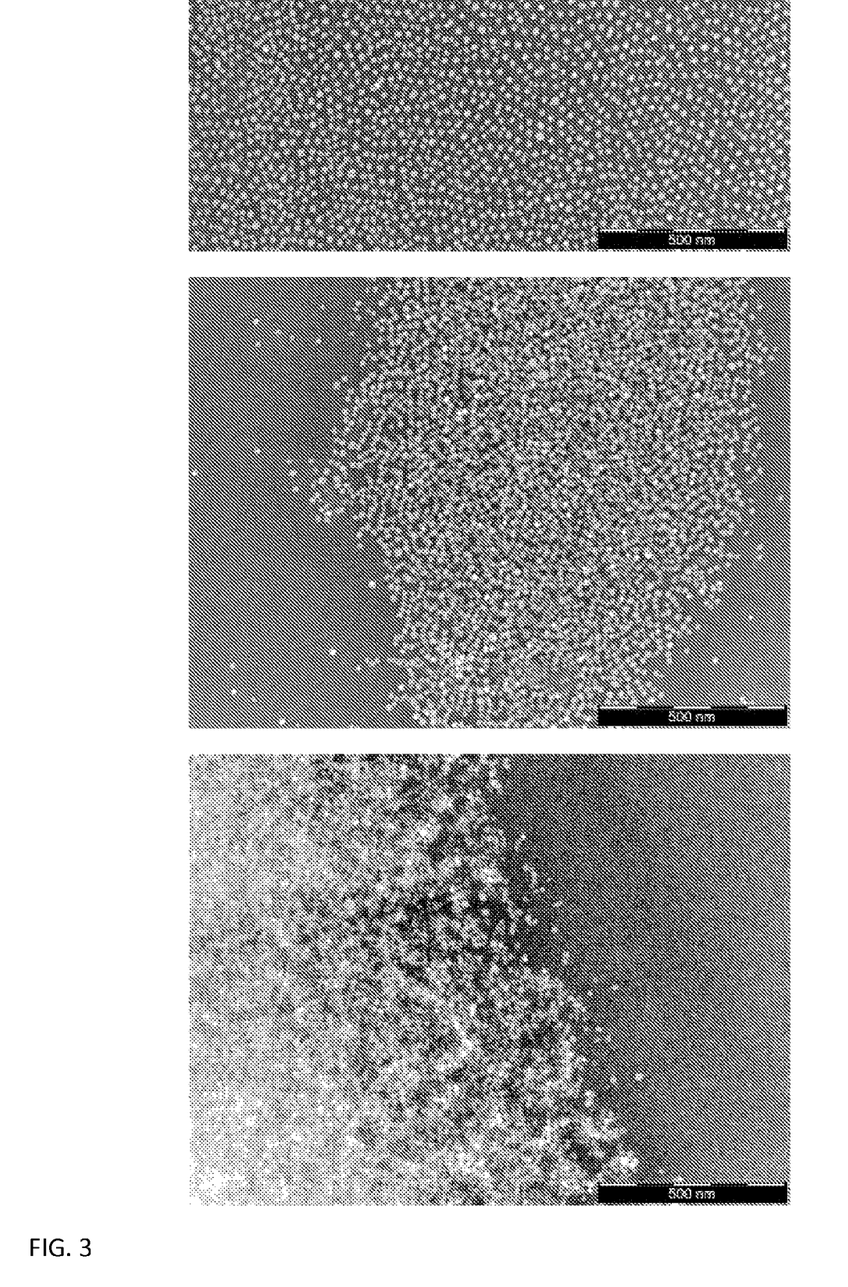
FIG. 3 shows a series of transmission electron microscopy images of a nanoscale ionic material containing 20 weight percent acid functional silica nanoparticles in an amine functional polyethylene glycol organic polymer matrix in accordance with the embodiments (i.e., top transmission electron microscopy image) in comparison with: (1) a related first control sample nanoscale material including a sodium functional silica nanoparticle rather than an acid functional silica nanoparticle (i.e., middle transmission microscopy image); or (2) a related second control sample nanoscale material including a hydroxyl functional polyethylene glycol organic polymer matrix material rather than an amine functional polyethylene glycol organic polymer matrix material.

FIG. 3 shows a series of transmission electron microscopy images that compare the dispersion between the nanoscale ionic material in accordance with the embodiments and one of the control samples, both at 20 wt % silica content (samples H-20 and HC-II-20). FIG. 3 at the top transmission electron microscopy image shows excellent dispersion with the core silica nanoparticles evenly dispersed in the canopy organic polymer material for a nanoscale ionic material in accordance with the embodiments. In contrast aggregation and phase-separation of the silica particles can be seen in FIG. 3, middle transmission microscopy image and FIG. 3 lower transmission microscopy image suggesting that only nanoscale ionic materials in accordance with the embodiments can resist phase-separation of the core silica particles from the canopy polymer effectively, as the core inorganic metal oxide nanoparticles repel each other and attract the organic polymer material molecules.

Figure 4:
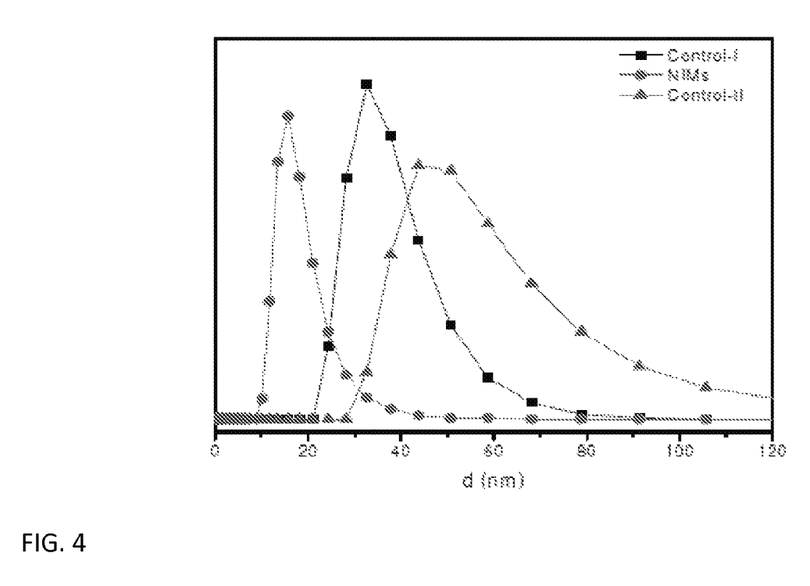
FIG. 4 shows a graph of number weighted particle size distribution obtained from dynamic light scattering data for a nanoscale ionic material in accordance with the embodiments, in comparison with the two related control samples described within FIG. 3.

The transmission electron microscopy images of FIG. 3 are further corroborated by dynamic light scattering (DLS) measurements of all samples in water, as shown in FIG. 4. Nanoscale ionic materials in accordance with the embodiments show an average particle size (18 nm) and distribution virtually identical to the original silica suspension. In contrast, both control samples show much larger particle sizes and wider distributions suggesting particle aggregation. The lack of aggregation in nanoscale ionic materials in accordance with the embodiments is contrasted with suspensions of silica nanoparticles in various solvents including ionic liquids, where aggregation is a significant challenge.

Figure 5:
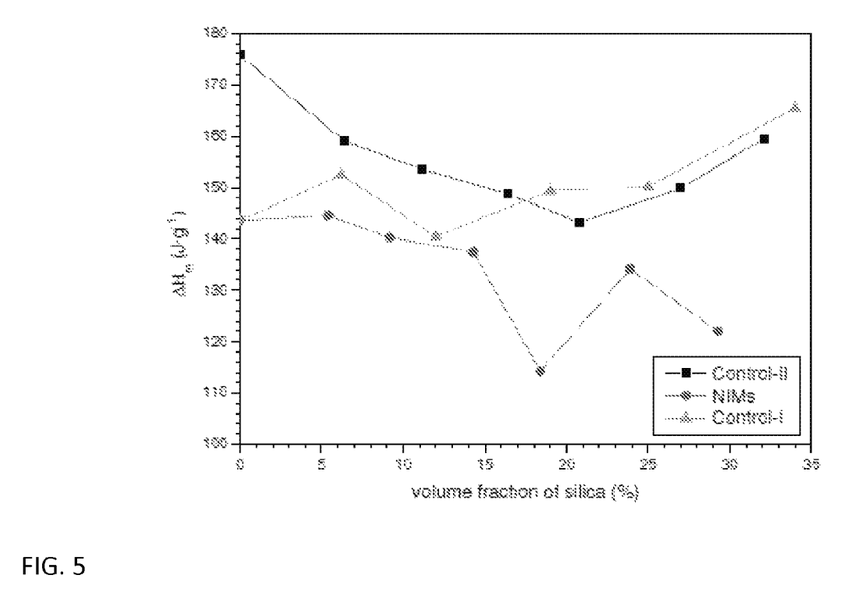
FIG. 5 shows a graph of heat of fusion as a function of volume fraction of silica for a nanoscale ionic material in accordance with the embodiments, in comparison with the two related control samples as described in FIG. 3.
Figure 6:
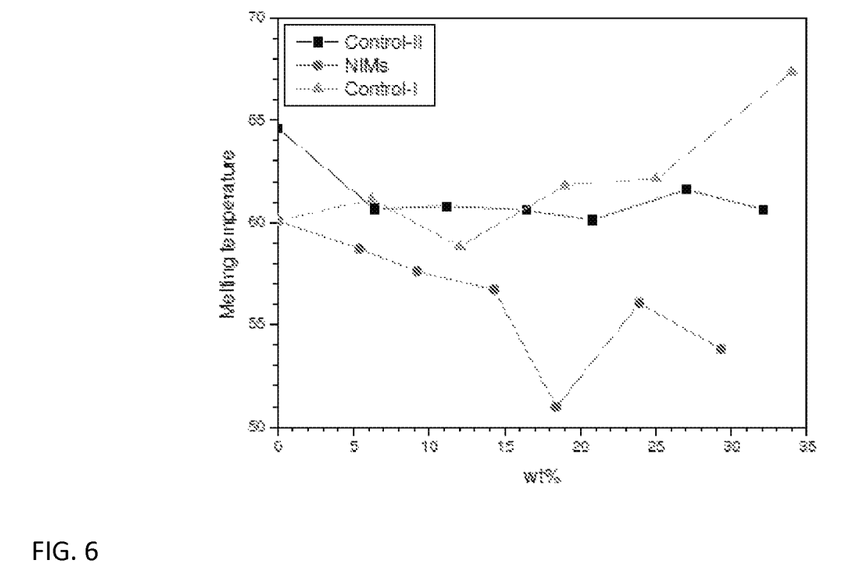
FIG. 6 shows a graph of melting temperature as a function of volume percentage silica for a nanoscale ionic material in accordance with the embodiments, in comparison with the two related control samples as described in FIG. 3.

FIG. 5 shows the normalized heat of fusion and FIG. 6 shows the melting temperature for the silica nanoscale ionic materials in accordance with the embodiments and the two controls obtained from a second DSC heating cycle. The melting point of the PEG chains in both controls remains more or less unchanged as the amount of silica content increases, at least for concentrations</=35 wt %. Interestingly, the melting temperature monotonically decreases and abruptly drops by 10° C. from the neat PEG for the fully neutralized nanoscale ionic material sample H-20. The heat of fusion follows a somewhat similar behavior. For Control II one may see first a monotonic decrease followed by an increase at higher silica volume fractions. Again for the H-20 nanoscale ionic material sample an abrupt change in the heat of melting is observed. Repeated measurements with freshly made samples confirm the reproducibility of the results. Since the abrupt decreases in melting point and heat of fusion are observed for the fully neutralized NIM compositions one may speculate that they are directly related to the ionic nature of the fully neutralized system.

Figure 7:
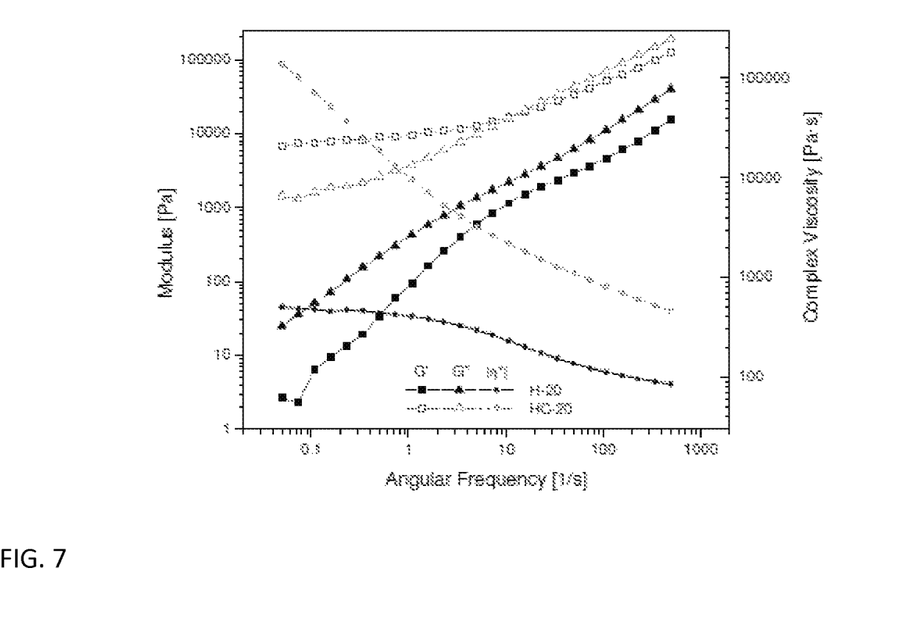
FIG. 7 shows a graph of oscillatory shear measurements (i.e., modulus and complex viscosity versus angular frequency) for a nanoscale ionic material in accordance with the embodiments, in comparison with the two related control samples as described in FIG. 3.

Oscillatory shear measurements provide a useful probe into the rheological behavior of the system. FIG. 7 shows the storage and loss moduli (G' and G"), and the complex viscosity, n*, as a function of frequency. G" being greater than G' throughout the frequency range and shear thinning behavior are consistent with a viscoelastic fluid behavior for the silica nanoscale ionic materials in accordance with the embodiments. In contrast, for low frequencies, G' is greater than G", indicating a solid "rubbery" behavior for HC-20. At higher frequencies, HC-20 transitions to glassy behavior with G">G' as expected for solid silica-polyethylene glycol composites. More importantly, the relative zero shear viscosity of HC-20 is at least three orders of magnitude higher compared to the silica nanoscale ionic materials in accordance with the embodiments. As mentioned above all samples from Control I are solid-like and are not suitable for rheological measurements.

It is possible to obtain characteristic relaxation times from both flow and oscillatory rheological measurements. For flow curves, the relaxation time is estimated as the reciprocal of the shear rate where the viscosity becomes shear-rate dependent, while for oscillatory curves it is the reciprocal of the frequency at which the complex viscosity becomes frequency-dependent.

The approximate relaxation times for the nanoscale ionic material samples in accordance with the embodiments are $\tau_{H-25}=1600$ s, $\tau_{H-20}=12.5$ s, $\tau_{H-15}=5$ s, and $\tau_{H-10}=1.2$ s, (the subscript refers to the mass fraction of silica) and is approximately the same for flow and oscillatory measurements. One may consider that this relaxation time may be due to the movement of the core silica nanoparticles through the organic polymer material chains. The abrupt decrease in relaxation time for H-20 corresponds to the fully neutralized sample. Comparison of H-20 with the control HC-20 shows that the long relaxation is much slower for HC-20, with an extrapolated time, $\tau_{HC-20} \sim 1500$ s, as compared to $\tau_{H-20}=12.5$ s for H-20. One may attribute the longer relaxation time to the diffusion of larger, more aggregated particles and the absence of ionic interactions in the control sample.

SUMMARY

Demonstrated in accordance with the foregoing embodiment is a new platform of nanoparticle ionic material compositions (i.e. including nanoscale ionic liquid material compositions, nanoscale ionic gel material compositions and nanoscale ionic solid material compositions) synthesized and prepared by reacting directly acidified silica nanoparticles with an average diameter of 18 nm with an amine-terminated polyethylene glycol, PEG-NH$_2$ in an acid-base reaction. In contrast with alternative systems, the inventive approach eliminates an intervening surface modification processing step intended to create a charged corona surrounding a silica nanoparticle and thus greatly simplifies the synthesis protocol and reduces the number of system components. Additionally, a processing scheme for a nanoscale ionic material composition in accordance with the embodiments eliminates any dialysis or ultrafiltration steps previously required to ensure absence of byproducts. Since all steps required to synthesize the new fluids are simple and scalable the process can be readily integrated into current manufacturing.

In addition, an equivalence point obtained from a neutralization reaction when preparing a nanoscale ionic material in accordance with the foregoing illustrative embodiments corresponds with a sample containing ~20 wt % silica. This silica content corresponds to about 1100 PEG chains per particle, suggesting that approximately 15% of the available OH groups are reacted. The presence of ionic species is corroborated by zeta potential and electrical conductivity measurements. The presence of ionic species endows the materials with a unique behavior. First, they show remarkable dispersion of the SiO$_2$ nanoparticles into the polymer. The materials become liquids at 70° C. and exhibit an ionic conductivity of $10e^{-5}$ S/cm. The fully neutralized sample corresponding to the equivalence point in the neutralization reaction shows abrupt decreases in the melting point and heat of fusion. More importantly, compared to two series of controls composed of a physical mixture with the same ratio of SiO$_2$ to PEG (i.e. systems that are void of any electrostatic interactions) the ionic SiO$_2$ fluids exhibit remarkably different dispersion and flow properties. G" being greater than G' throughout the frequency range and shear thinning behavior are consistent with a viscoelastic fluid behavior for the silica nanoscale ionic materials in accordance with the embodiments. In addition, the relative zero-shear viscosity of the silica nanoscale ionic materials in accordance with the embodiments is at least three orders of magnitude lower compared to one of the controls, Control-II, which exhibits solid-like behavior. The other control is also solid and with a modulus/viscosity outside the range of the rheometer capabilities.

All references, including publications, patent applications, and patents cited herein are hereby incorporated by reference in their entireties to the extent allowed, and as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein is merely intended to serve as a shorthand method of referring individually to each separate value falling within the range, unless otherwise indicated herein, and each separate value is incorporated into the specification as if it was individually recited herein.

All methods described herein may be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A nanoparticle comprising:
   an inorganic metal oxide material core absent an organofunctional corona; and
   an organic polymer material canopy surrounding the inorganic metal oxide material core, wherein the organic polymer material canopy is tethered to the inorganic metal oxide material core by an acid-base-based ionic bond.

2. The nanoparticle of claim 1, wherein the nanoparticle is characterized by at least one of: an aqueous solution having a zeta potential greater in magnitude than about +/−5 mV; and a conductivity measured at greater than about $1e^{-7}$ S/cm.

3. The nanoparticle of claim 1, wherein the nanoparticle is characterized by release of the inorganic metal oxide material core that is substantially absent of any organic material residue upon treatment with an alkali hydroxide material.

4. The nanoparticle of claim 1, wherein the inorganic metal oxide material core has a diameter from about 1 to about 500 nanometers.

5. The nanoparticle of claim 1, wherein the inorganic metal oxide material core comprises at least one inorganic metal oxide material selected from the group consisting of silicon oxide, titanium oxide, zinc oxide, magnesium oxide, calcium oxide, copper oxide, tungsten oxide and zirconium oxide inorganic metal oxide materials.

6. The nanoparticle of claim 1, wherein the inorganic metal oxide material core comprises at least two inorganic metal oxide materials, each inorganic metal oxide material of the at least two inorganic metal oxide materials being selected to provide only one of acid characteristics and base characteristics.

7. The nanoparticle of claim 1, wherein the organic polymer material canopy comprises an organic polymer selected from the group consisting of acid functional organic polymers and base functional organic polymers.

8. A composition comprising:
   a plurality of inorganic metal oxide nanoparticle material cores, each inorganic metal oxide nanoparticle material core of the plurality of inorganic metal oxide nanoparticle material cores being absent of an organofunctional corona; and
   an organic polymer material canopy surrounding and uniformly separating each of the plurality of inorganic metal oxide nanoparticle material cores, wherein the organic polymer material canopy is tethered to each of the plurality of inorganic metal oxide nanoparticle material cores by an acid-base-based ionic bond.

9. The composition of claim 8, wherein the composition is characterized by at least one of: an aqueous solution having a zeta potential greater in magnitude than about +/−5 mV; and a conductivity measured at greater than about $1e^{-7}$ S/cm.

10. The composition of claim 8, wherein the composition is characterized by release of the inorganic metal oxide material core that is substantially absent of any organic material residue upon treatment with an alkali hydroxide material.

11. The composition of claim 8, wherein each of the plurality of inorganic metal oxide material cores has a diameter from about 1 to about 500 nanometers.

12. The composition of claim 8, wherein each of the plurality of inorganic metal oxide nanoparticle material cores comprises at least one inorganic metal oxide material selected from the group consisting of silicon oxide, titanium oxide, zinc oxide, magnesium oxide, calcium oxide, copper oxide, tungsten oxide and zirconium oxide inorganic metal oxide nanoparticle material cores.

13. The composition of claim 8, wherein each of the plurality of inorganic metal oxide nanoparticle material cores comprises a mixed inorganic metal oxide material comprising at least two inorganic metal oxide materials selected to provide only one of acid characteristics and base characteristics.

14. The composition of claim 8, wherein the plurality of inorganic metal oxide nanoparticle material cores comprises a mixture of at least two different inorganic metal oxide nanoparticle material cores of different inorganic metal oxide materials selected to provide only one of acid characteristics and base characteristics.

15. The composition of claim 8, wherein the composition comprises from about 1 to about 85 weight percent inorganic metal oxide nanoparticle material cores.

16. The composition of claim 8, wherein the organic polymer material canopy comprises an organic polymer selected from the group consisting of acidic organic polymer materials and basic organic polymer materials.

17. The composition of claim 8, wherein the composition comprises a nanoscale ionic material composition.

18. The composition of claim 17, wherein the nanoscale ionic material composition comprises one of a nanoscale ionic liquid material composition, a nanoscale ionic gel material composition and a nanoscale ionic solid material composition.

19. The composition of claim 8, wherein each of the plurality of inorganic metal oxide nanoparticle material cores comprises at least one of an acid component and a base component, and the organic polymer material canopy comprises at least one of an acid component and a base component that is opposite to that of each of the plurality of inorganic metal oxide nanoparticle material cores.

20. A method for preparing a composition, the method comprising:
   reacting directly at least one inorganic metal oxide nanoparticle core in an acid/base reaction with an organic polymer material canopy to provide a nanoscale ionic material composition, wherein an inorganic metal oxide nanoparticle core of the at least one inorganic metal oxide nanoparticle core is absent of an organofunctional corona, the inorganic metal oxide core of the at least one inorganic metal oxide nanoparticle material core being tethered to the organic polymer material canopy by an acid-base-based ionic bond.

21. The method of claim 20, wherein the at least one inorganic metal oxide nanoparticle core comprises at least one inorganic metal oxide material selected from the group consisting of silicon oxide, titanium oxide, zinc oxide, magnesium oxide, calcium oxide, copper oxide, tungsten oxide and zirconium oxide inorganic metal oxide materials.

22. The method of claim 20, wherein the at least one inorganic metal oxide nanoparticle core comprises a mixed inorganic metal oxide material comprising at least two different inorganic metal oxide materials selected to provide only one of acid characteristics and base characteristics.

23. The method of claim 20, wherein the at least one inorganic metal oxide nanoparticle core comprises a mixture of at least two inorganic metal oxide nanoparticle cores of different inorganic metal oxide materials selected to provide only one of acid characteristics and base characteristics.

24. The method of claim 20, wherein the organic polymer material canopy comprises a functional organic polymer material, and the inorganic metal oxide nanoparticle core is added to the functional organic polymer material.

25. The method of claim 24, wherein:
the at least one inorganic metal oxide nanoparticle core comprises an acid component within the acid/base reaction; and
the functional organic polymer material comprises a base component within the acid/base reaction.

26. The method of claim 24, wherein:
the at least one inorganic metal oxide nanoparticle core comprises a base component within the acid/base reaction; and
the functional organic polymer material comprises an acid component within the acid/base reaction.

27. The method of claim 24, wherein the functional organic polymer material is selected from the group consisting of amine functional organic polymer materials, imine functional organic polymer materials, pyridine functional organic polymer materials, carboxylic acid functional organic polymer materials, phosphonic acid functional organic polymer materials and sulfonic acid functional organic polymer materials.

28. The method of claim 24, wherein:
the inorganic metal oxide nanoparticle core comprises a silica material; and
the functional organic polymer material comprises an amine functional organic polymer material.

29. The method of claim 20, wherein the nanoscale ionic material composition comprises one of a nanoscale ionic liquid material composition, a nanoscale ionic gel material composition, and a nanoscale ionic solid material composition.

30. A composition comprising:
an inorganic metal oxide material core absent an organofunctional corona, the inorganic metal oxide material core comprising at least one of an acid component and a base component; and
an organic polymer material canopy surrounding the inorganic metal oxide material core, the organic polymer material canopy comprising at least one of an acid component and a base component that is opposite to that of the inorganic metal oxide material core, wherein the organic polymer material canopy is tethered to the inorganic metal oxide material core by an acid-base-based ionic bond.

* * * * *